United States Patent [19]
Godsey

[11] 3,774,450
[45] Nov. 27, 1973

[54] TEMPERATURE INDICATING COMPOSITION
[75] Inventor: Frank W. Godsey, St. Petersburg, Fla.
[73] Assignee: Bio-Medical Sciences, Inc., Fairfield, N.J.
[22] Filed: July 15, 1971
[21] Appl. No.: 162,872

[52] U.S. Cl. .............................. 73/358, 116/114 V
[51] Int. Cl. .......................................... G01k 11/08
[58] Field of Search ............................. 73/358, 356; 116/114 V

[56] References Cited
UNITED STATES PATENTS
3,521,489  7/1970  Finkelstein et al. .................. 73/358
3,465,590  9/1969  Kluth .................................... 73/356
2,046,863  7/1936  Allphin ................................. 73/358
2,662,018  12/1953 Smith ............................... 73/358 X
3,430,491  3/1969  Gignilliat .............................. 73/358
3,631,720  1/1972  Weinstein et al. ................... 73/358

Primary Examiner—Richard C. Queisser
Assistant Examiner—Joseph W. Roskos
Attorney—Elmer R. Helferich et al.

[57] ABSTRACT

An improved temperature indicator is provided which comprises a carrier having at least one but preferably a plurality of regions, each containing a substance consisting of a core material and a wall material encapsulating the core material. Each core material is a thermally responsive substance which undergoes change of state at precise and predetermined temperature and the wall material is a frangible coating which can be ruptured by the application of a relatively mild pressure. An indicator means overlies the temperature indicating portion of said indicator in association with said regions so that when the frangible coating is ruptured, the indicator means becomes intimately associated with said core material. The wall material is capable of withstanding hostile environmental conditions which protects the core material from premature exposure until the temperature indicator is ready to be used for its intended application.

23 Claims, 6 Drawing Figures

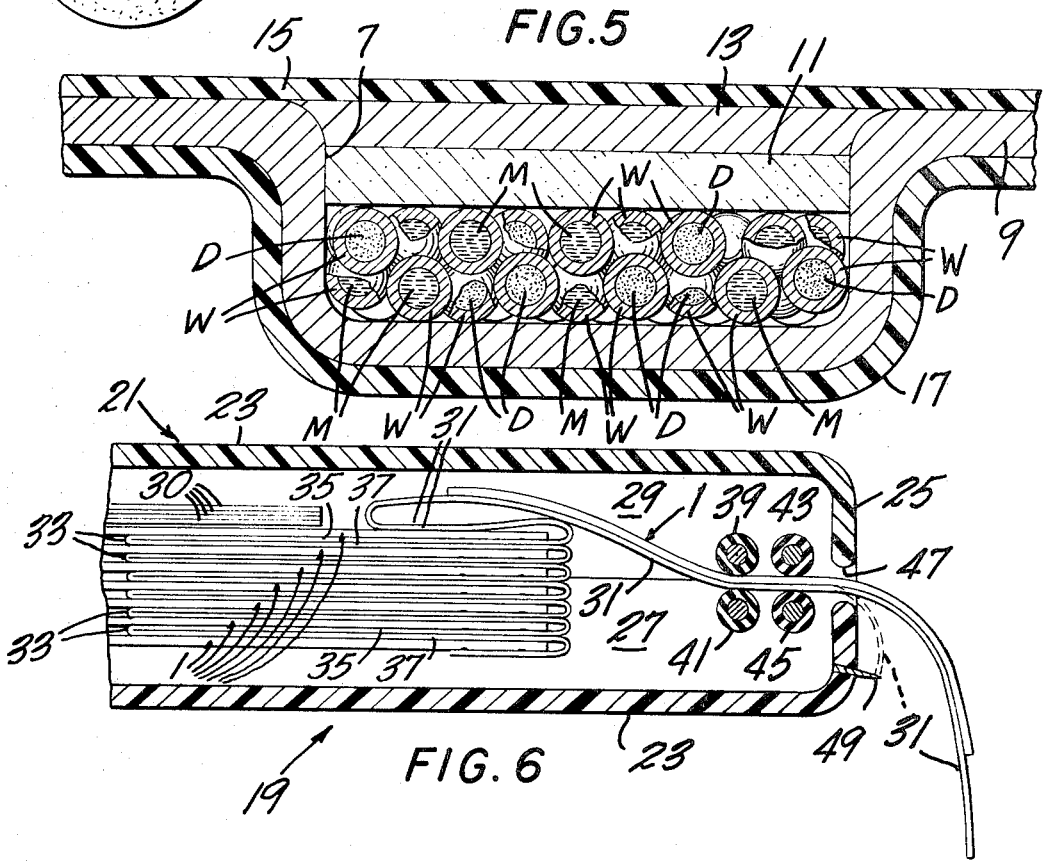

TEMPERATURE INDICATING COMPOSITION

BACKGROUND OF THE INVENTION

Commonly assigned, copending application Ser. No. 120,998, filed Mar. 4, 1971 by Zsigmond Sagi and Berel Weinstein describes the use of certain solid solutions as thermally responsive materials which are uniquely suitable as temperature indicating compositions for use in the so-called disposable type thermometers. These solid solutions are comprised of two components which, inter alia, have linear temperature-compositions liquidous curves. Furthermore, these solid solutions are capable of undergoing change in state at precise and predetermined temperatures which are visually detectable by means of an associated dye-containing indicator system as therein described.

In another commonly assigned, copending application Ser. No. 120,891, also filed Mar. 4, 1971, by Charles G. Pickett and Desh D. Chadha now U.S. Pat. 3,704,985, the inventors therein describe improved temperature indicating compositions which, as in application serial number 120,998, supra, are also capable of undergoing change of state at precise and predetermined temperatures and, wherein temperature detection is also made visually using an associated indicator system. However, in the latter case, certain organic compounds are incorporated into the indicator system which are capable of forming eutectic mixtures with said thermally indicating compositions. This permits the use of the temperature indicator for temperature measurements at the incipient fusion temperatures of said temperature indicating compositions.

When used in disposable thermometers for clinical applications, these temperature indicating compositions cover the clinical temperature range, i.e., 96°F. to 105°F. Accordingly, precautions must be taken to avoid exposing the thermometer to temperatures above 96°F., in cases where the thermometer is used for clinical applications, or above the minimum temperature which the indicator is capable of detection and registration since this will result in premature registration of temperature, hence rendering the indicator unsuitable for its intended use. Such exposure may be experienced, for example, during shipment and transportation where temperatures as high as about 120°F. or more may be encountered. Thus it is apparent that these temperature indicating compositions must be protected against such exposures and premature registration.

SUMMARY OF THE INVENTION

The present invention relates to improved temperature indicators in which the thermally responsive materials are protected from hostile environments until they are ready to be used for their intended applications.

In one aspect, this invention is concerned with providing a frangible protective shield or coating for such temperature indicating compositions wherein the coating or shield has higher thermal stability than said compositions hence protecting said compositions from undergoing change of state until the indicator is ready to be used for its intended application.

In another aspect, the invention herein contemplates providing an encapsulated or microencapsulated temperature indicating composition comprising a core material, i.e., the temperature indicating composition, and a wall material, i.e., the protective shield or coating, wherein the wall material prevents the core material from undergoing change of state until the wall material is ruptured, usually before the intended use of the indicator.

These and other aspects of this invention will be more clearly comprehended from the following detailed description of the invention taken in conjunction with the accompanying drawings. Throughout the ensuing discussion, the terms "thermally responsive substance" or "temperature indicating composition" are employed to denote the same type of materials.

DESCRIPTION OF THE DRAWINGS

In the drawings appended hereto, where like numerals are employed to designate like parts:

FIG. 1 is a plan view of a thermometer utilizing the principles of this invention;

FIG. 2 is a vertical section taken along the line II—II of FIG. 1;

FIG. 3 is an enlarged view of the particulate form of an encapsulated temperature indicating composition useful in the practice of this invention;

FIG. 4 is an enlarged view of another embodiment of the particulate form of the encapsulated temperature indicating composition useful herein having a dye coating on the wall material;

FIG. 5 depicts another embodiment of the invention wherein the temperature indicating composition and the dye or pigment are separately provided with protective walls and wherein several such coated particles are shown in one cavity in exaggerated dimensions in order to facilitate the understanding of this invention, and FIG. 6 is a side elevational view, in section, showing the dispensing end of a typical package for disposable thermometers of the type contemplated by this invention and illustrating the manner in which the frangible protective coating may be ruptured when the thermometer is dispensed therefrom.

DETAILED DESCRIPTION OF THE INVENTION

Referring now to FIGS. 1 and 2 there is shown a thermometer 1 having a handle portion 3 and an indicator portion 5 adapted for insertion into the human mouth for oral temperature measurements. The indicator portion contains a plurality of regions or cavities 7 in grid or matrix form as shown in FIG. 1. Each cavity is filled with a coated temperature indicating composition T the core material of which melts at a precise and predetermined temperature different from the core material in the other cavities. Furthermore, the melting point of these materials are considerably below the melting point of the materials with which they are coated. In the device illustrated herein, i.e., clinical disposable thermometer, each temperature indicating composition melts at a temperature different from the melting temperature of the composition in the next adjacent cavity by 2/10th of a Fahrenheit degree.

While FIG. 1 illustrates a plurality of such regions or cavities, it must be understood that only one such region may be employed in those instances where the indicator is employed for the detection of a single predetermined temperature or thermal state of the environment or the test subject.

As is further shown in FIG. 2, the thermometer 1 is comprised of a carrier sheet 9 which contains the aforesaid cavities 7. Only two such cavities are shown in exaggerated dimensions in order to facilitate understanding of this description.

The carrier sheet 9 is generally provided as a sheet of flexible, heat-conductive material such as an aluminum foil. This will insure rapid heat transfer from the test subject to the temperature indicating compositions in said cavities. While aluminum foil is very convenient for this purpose, flexible, heat-conductive sheets of other materials such as, for example, copper, silver, gold, stainless steel or any other heat-conductive pliable material can be employed with similar efficacy. Naturally the heat-conductive carrier sheet 9 must be made of a material which has a high thermal conductivity, relatively large surface area of contact with the test subject and must be of minimum thickness, while preserving its structural integrity, in order to permit rapid conduction of heat into the thermally responsive substances in said cavities. When aluminum foil is used as the carrier sheet, its thickness may vary from about 0.001 to about 0.004 mils. In any event, the selection of such heat-conductive carrier sheets is well within the knowledge of those skilled in the art and requires no additional elaboration.

Superimposed upon the temperature indicating composition and in intimate contact therewith, there is shown an indicator layer 11 and a masking layer 13 which overlies the indicator layer. The composite indicator layer-masking layer will hereinafter be referred to as the "indicator system" or "indicator means."

A transparent layer 15 such as, for example, polypropylene, Mylar, Nitrocellulose, polyvinyl chloride, etc., is provided as a cover film coextensive with and attached to carrier sheet 9 sealably or by any other suitable means. Furthermore, in order to provide structural integrity to the thermometer and to avoid contact between the human mouth and the aluminum foil, the carrier sheet 9 is provided with an undercover layer 17 (usually of similar material as layer 15) which is coextensive with and overlies the lower surface of carrier sheet and conformally contours the aforesaid cavities. This undercover layer is usually adhesively attached to the carrier sheet.

The thickness of the undercover layer is generally in the order of from about 0.001 to about 0.003 mils in order to facilitate rapid heat transfer from the test subject to carrier sheet 9 and hence to the thermally responsive substances in the aforesaid cavities.

If desired, a heat conductive metallic powder may be added to the undercover layer in order to improve its heat transfer characteristics. Powdered metallic aluminum has been found to be particularly satisfactory for this purpose.

The coated (or encapsulated) temperature indicating composition is shown in FIG. 3 wherein the core material M is either a solid solution as described in the aforementioned application of Sagi and Weinstein, or a eutectic-forming composition as described in the aforementioned patent of Pickett et al. The core material M is coated with or is encapsulated by a frangible wall W made of a material such as gelatin, ethyl cellulose, saran, or any other frangible material such as a thin metal which is readily ruptured by mild pressure. The thickness of the coating layer of wall W may vary from about 0.0002 inch to about 0.015 inch. Generally, this thickness must be sufficient to provide a complete protective coating for the core material M so as to prevent it from premature exposure and adverse environmental conditions until the indicator is ready to be used for its intended application. On the other hand, since the wall W must be readily rupturable, its thickness need not be so excessive as to require unduly high force or pressure to cause its rupture. The procedure for providing the core material M with such protective shield, i.e., wall W will be hereinafter described in further detail.

As described in the aforementioned copending applications, the dye or pigment employed to facilitate visual detection of temperature measurement are generally incorporated into the indicator means or, in cases where the dye or pigment are non-reactive with the temperature indicating compositions, they may be mixed directly with these compositions. The use of encapsulated temperature indicating compositions in accordance with this invention obviates the need for incorporation of the dye or pigment into the indicator means. Furthermore, even in those cases where the dye or pigment are reactive with the temperature indicating compositions, the present invention affords a method for their use. Thus according to the instant invention, the dye may be incorporated into the wall material as shown in FIG. 3, or they may be absorbed on the outer surface of the wall material as shown in FIG. 4. Alternatively, the dye or pigment may themselves be encapsulated separately as shown in FIG. 5. In the latter embodiment, the encapsulated dye or pigment and the encapsulated temperature indicating composition are both dispensed into cavities 7 of the thermometer.

While the frangible coatings of the thermally responsive substances may, as was previously mentioned, be readily ruptured by pressing between the fingers, in order to achieve a more uniform and complete rupture of the frangible coatings across the matrix portion of the thermometer, resort may be had to a pair of oppositely rotating rollers through which the thermometer may be passed as shown, for example, in FIG. 6. Referring now to this drawing, there is shown the dispensing end of a package 19 such as that shown and described in detail in FIG. 3 of copending application Ser. No. 120,997, filed Mar. 4, 1971 by Zsigmond Sagi, entitled "Device For Holding And Dispensing Thermometers", now U.S. Pat. 3,674,176. Although the thermometers described in said application have somewhat different construction than the thermometers described herein, the dispensing end of the package described herein illustrates the manner in which the frangible walls of the temperature indicating compositions may be uniformly ruptured to achieve the desired visual indication of temperature. Thus, referring to FIG. 6 herein, the dispensing end of package 19 is shown to include an elongated housing 21 comprising spaced generally parallel top and bottom walls 23 between which extend a pair of end walls, one wall 25 at the dispensing end of the package and the other wall at the opposite end (not shown) of the package. Furthermore, front and rear side walls 27 and 29 can be embodied in the housing. A plurality of thermometers 1 and carrier tape 31 are disposed in the housing 21 with the thermometers arranged in a superposed stacked position extending longitudinally therein with the carrier tape 31 being folded back and forth in a series of accordion pleat-like folds 33 with each such fold being interleaved between adjacent ones of the thermometers 1. Each fold 33 includes two fold parts to one 35 which is attached a thermometer 1 with the other fold part 37 disposed against the next succeeding thermometer in the stack.

The construction of the housing 21 and the detailed arrangements of thermometers 1 and the manner in which they are positioned and secured in the housing are generally as described in the aforementioned U.S. Pat. No. 3,674,176, or in any other suitable manner. For the purpose of this invention, however, attention will be focused on the dispensing end of the package 19. During the dispensing of the thermometer 1, it is necessary to apply some pressure thereto in order to rupture the frangible walls W of the encapsulated materials in the cavities 7 of the thermometer. Accordingly, pressing means are provided in the housing 19 in the form of first pair of rollers 39 and 41. In order to insure more complete and uniform rupturing of the frangible walls W, a second pair of rollers 43 and 45 may be provided as shown in FIG. 6. Rollers 39 and 41 are located adjacent the opening 47 in the end wall 25 and the second pair of rollers 43 and 45 are located by said opening intermediate of the first pair of rollers and the opening.

The aforesaid rollers are supported in the housing for rotation about axes transverse of the housing and being spaced in opposition to form nips between each pair. Thus, in the passage of the thermometer 1 and carrier 31 through the aforesaid rollers and through the opening 47, the rollers apply pressure to the thermometer in the manner heretofore described, thereby rupturing the walls W of the encapsulated materials in the aforesaid cavities. In order to insure uniform application of pressing force, the surface portions of the rollers 39 and 41 are made of readily compressible, resilient material which conformably contact the thermometer during dispensing to insure uniform application of such pressure. When a second pair of rollers such as rollers 43 and 45 are employed, they may also be made of such resilient material. However, rollers 43 and 45 need not have surfaces of resilient character but rather, they may have relatively hard surfaces which could serve as fixing or gauging means where necessary.

When it is desired to dispense the first thermometer, a pulling force is applied to the carrier tape 31 and the first thermometer 1 and a certain length of the carrier tape will be drawn outwardly through the opening 47. In the course of such passage, the wall material W of the encapsulated composition will be ruptured by the aforesaid rollers and one accordion pleat-like fold 33 will be unfolded. When the thermometer 1 has been fully pulled out of the housing, a certain length of the carrier tape associated therewith can be severed such as by a cutting edge 49 on the wall 25, leaving a free end of the carrier tape for initiating the dispensing of the next thermometer.

The methods of providing a protective shield such as wall W for a core material are not, per se, novel as there are several techniques which can be employed for this purpose. Thus, for example, James A. Herbig in an article entitled "Microencapsulation," Reprinted from Kirk-Othmer: Encyclopedia of Chemical Technology, Volume 13, Second Edition (1967), pages 436–456, describe a process for the encapsulation of particulate matters for protection against environmental and deleterious influences. Somewhat similar techniques are described in a paper by Joseph A. Baker, entitled "Microencapsulation as Applied to Pharmaceutical Products," presented on Oct. 4, 1968 at Eastern Regional IPT Section, Academy of Pharmaceutical Sciences, Philadelphia, Pennsylvania, and in U.S. Pat. No. 3,116,206 on "Encapsulated Process and Its Product" issued to Carl Byrnko et al. on Dec. 13, 1963.

Basically, the encapsulation procedures described in the aforementioned patent and articles comprise dispersing the particulate matter (core material) through a non-reactive liquid media, adding the wall or coating material, usually in liquid form, to the resulting dispersion and depositing the liquid coating upon the core material under controlled physical mixing of the liquid coating material and the core material in the aforementioned liquid media, and at optimum temperature and pH levels. After the liquid coating material has formed a uniform and adherent wall around the core material, this coating is rigidized by thermal, cross-linking or desolvation techniques. When the coating is regidized by cross-linking techniques, the cross-linking agents employed are aldehydes of the type commonly employed for cross-linking of proteins and other proteinaceous substances.

Depending upon the particle size of the core materials, this coating technique may be referred to as encapsulation or microencapsulation. In microencapsulation the particle size of the core material may range from several tenths of a micron to 5,000 microns whereas in the encapsulation processes referred to in the prior art processes, the particle sizes are usually greater than 5,000 microns.

The protective coating, i.e., the wall material W may also be applied to the core material by other known techniques such as, for example, pan coating, spray-congealing, fluid bed coating, mechanical coating, electrostatic coating, vacuum deposition, etc. In all cases, the wall material W is provided as a uniform, adherent coating around the core material to protect it against hostile environments and adverse influences. Yet, this wall material must be frangible so that it may be readily ruptured prior to the use for which the core materials are intended.

In providing a coating or a wall material W for the core materials described herein, the conditions employed must be such that the thickness of the protective coating is from about 0.0002 inch to about 0.015 inch. Naturally, these conditions will vary depending upon the core material, the wall material, the liquid media, temperature, particle size of the core material, pH of the liquid media, etc. These conditions are generally described in the aforesaid patent and publications and the selections of the optimum conditions in each case is well within the scope of knowledge of those skilled in the art.

The coating materials for the purpose of this invention are generally polymeric materials which have opposite solubility from the core materials. In other words, if the core materials are insoluble in water or the liquid media in which they are coated, the wall materials must be substantially soluble therein. Thus, when the core material is water insoluble, the wall material is preferably a water soluble polymer such as, for example, polyvinyl alcohol ethyl cellulose and gelatin or gelatinous materials.

Other coating materials may also be employed provided they form a uniform adherent coating for the core material and yet are frangible enough to be ruptured by the application of relatively mild pressing force. For example, the core material may be enveloped or encapsulated with a thin layer of a metal such as aluminum foil having a thickness of about 0.0003 inch. However, encapulating the core particles with a polymeric material as aforesaid is both preferable and more economical than the use of metallic coatings.

If desired, the wall material may be applied in multiple layers, preferably two layers, an inner coating of gelatin or gelatinous material and an outer coating of another polymeric material such as polyvinyl alcohol.

The liquid media in which the wall material W and the core material M are admixed must generally be non-reactive toward these materials and a non-solvent therefor. Such liquid media include water and other liquid media such as those described in the aforementioned publications.

As shown in the embodiment depicted in FIG. 5, the dye or pigment used to facilitate visual observation of the temperature measurement may themselves be encapsulated and thus provided with a protective coating such as the wall W. This may be accomplished by simply dispersing the dye or pigment in a non-reactive liquid media and coated with the wall material as hereinbefore described. However, when the temperature indicating composition is coated with a protective shield, the dye or pigment may or may not be coated since in this case there is no likelihood of a reaction between the dye or pigment and the temperature indicating composition until the frangible wall W is ruptured prior to the use of the temperature indicator.

Thus, according to the present invention, an improved temperature indicating composition is provided which can be employed in disposable type thermometers such as those described in the aforesaid copending applications.

These temperature indicating compositions are protected against hostile environments and adverse influences until the temperature indicator is ready to be used in their intended application.

While the foregoing invention has heretofore been described with a certain degree of particularity with reference to disposable type thermometers in order to facilitate the understanding of this invention, it is evident from the description herein that any temperature indicating composition or thermally responsive substance may be provided with a protective shield or coating to protect it against adverse environmental conditions.

The core materials in the aforementioned encapsulated compositions may be in the form of solid solutions as described in application Ser. No. 120,998, supra, or they may be eutectic forming compositions as disclosed in the aforementioned Pickett et al. patent. However, it must be emphasized that the core materials need not be limited to the types of compositions described in the aforesaid two applications. The invention herein is generally applicable to other thermally responsive substances such as those described in U.S. Pat. No. 3,175,401 issued on Mar. 30, 1965 to D.E. Geldmacher and U.S. Pat. No. 3,521,489 issued on July 21, 1970 to P. Finkelstein et al. These two patents describe the use of certain specified single components as thermally responsible substances for use in the types of indicators described therein.

Thus, the core material may be any of the compositions disclosed in Colum 2 of U.S. Pat. No. 3,175,401 (Geldmacher) or in Column 3 of U.S. Pat. No. 3,521,489 (Finkelstein et al). However, in clinical applications where accurate temperature measurements are required, the solid solutions described in the aforementioned application of Sagi and Weinstein and the eutectic forming mixtures described in the aforementioned application of Pickett and Chadha are preferable and particularly well suited for the purpose of this invention.

When using solid solutions as the core material of the encapsulated compositions for use in this invention, these solid solutions include:

A. Ortho-chloronitrobenzene: Ortho-bromonitrobenzene
B. l-menthol: dl-menthol
C. Acetophenone: Benzophenone
D. Dimethyl succinate: Dimethyl oxalate
E. 4-Chloropropiophenone: 4-Bromopropiophenone
F. 4-Chloro-2-methyl aniline: 4-Bromo-2-methyl aniline
G. 4-Chloroacetophenone: 4-Bromoacetophenone
H. n-Butyl sulfoxide: n-Butyl sulfone
I. n-Hexane: 2-Nonodecane
J. Cyclohexane; 2-nonodecane
K. alpha-Chlorocinnamaldehyde: alpha-Bromocinnamaldehyde.

Furthermore, as was previously stated, the core material may be of the type described in the aforementioned Pickett et al. patent, in which case the indicator system will include a so-called accelerator which is capable of forming a eutectic mixture with the core material. In such compositions, the core material may be either a solid solution as described in the aforementioned application Ser. No. 120,998 or single components such as those described in the aforementioned two patents. In both cases, however, the accelerator employed must have a higher melting point than the highest temperature indicating composition and as a practical matter, the melting point of these accelerators must exceed the melting point of the highest melting temperature indicating composition by about 4° to about 15°F. Exemplary accelerators which are useful in forming eutectic mixtures with the core materials include dibenzyl succinate, and other compounds of the type described in the aforementioned Pickett et al patent.

What is claimed is:

1. Temperature indicator comprising a carrier having a temperature indicating portion, said portion having at least one region containing a substance composed of a plurality of discrete particles, each particle consisting of a core material and a frangible wall material contiguously encapsulating said core material, said core material being a thermally responsive substance which undergoes change of state at predetermined temperature, and indicator means associated with said substance in said region, said indicator means being adapted to facilitate visual detection of the change of state of said core material.

2. Temperature indicator as in claim 1 wherein said indicator means comprises a dye or a pigment.

3. Temperature indicator as in claim 2 wherein said indicator means comprises a compound which forms a eutectic mixture with said core material and which compound has a higher melting point than the highest melting core material in said regions.

4. Temperature indicator as in claim 3 wherein said wall material is frangible coating of polymeric material.

5. Temperature indicator as in claim 2 wherein said wall material is frangible coating of polymeric material.

6. Temperature indicator as in claim 1 wherein said indicator means comprises a compound which forms a eutectic mixture with said core material and which compound has a higher melting point than the highest melting core material in said regions.

7. Temperature indicator as in claim 6 wherein said wall material is frangible coating of polymeric material.

8. Temperature indicator as in claim 1 wherein said wall material is frangible coating of polymeric material.

9. Temperature indicator comprising a carrier having a temperature indicating portion, said portion having at least one region containing a first substance comprising a first core material and a first wall material encapsulating said first core material, and a second substance comprising a second core material and a second wall material, said second core material being a dye or pigment, said first core material being a thermally responsive substance which under-goes change of state at predetermined temperature and said first wall and said second wall materials being frangible coatings rupturable by mild pressure, and indicator means associated with said first substance and said second substance in said region, said indicator means being adapted to facilitate visual detection of the change of state of said core material.

10. Temperature indicator as in claim 9 wherein said indicator means comprises a compound which forms a eutectic mixture with said core material and which compound has a higher melting point than the highest melting core material in said regions.

11. Temperature indicator as in claim 10 wherein said wall material is frangible coating of polymeric material.

12. Temperature indicator as in claim 9 wherein said wall material is frangible coating of polymeric material.

13. Temperature indicator comprising a carrier having a temperature indicating portion, said portion having a plurality of spaced regions, each region containing a substance composed of plurality of discrete particles, each particle consisting of a core material and a frangible wall material contiguously encapsulating said core material, said core material being a thermally responsive substance which undergoes a change of state at a predetermined temperature different from the temperature of the change of state in any other core material in said regions, an indicator means associated with said substances in said regions, said indicator means means being adapted to facilitate visual detection of the change of state of each of said core materials in said regions.

14. Temperature indicator as in claim 13 wherein said indicator means comprises a dye or pigment.

15. Temperature indicator as in claim 14 wherein said indicator means comprises a compound which forms a eutectic mixture with said core material and which compound has a higher melting point than the highest melting core material in said regions.

16. Temperature indicator as in claim 14 wherein said wall material is frangible coating of polymeric material.

17. Temperature indicator as in claim 13 wherein said indicator means comprises a compound which forms a eutectic mixture with said core material and which compound has a higher melting point than the highest melting core material in said regions.

18. Temperature indicator as in claim 17 wherein said first wall material and said second wall material are frangible coating of polymeric material.

19. Temperature indicator as in claim 13 wherein said wall material is frangible coating of polymeric material.

20. Temperature indicator comprising a carrier having a temperature indicating portion, said portion having a plurality of spaced regions, each region containing a first substance comprising a first core material and a first wall material encapsulating said core material, and a second substance comprising a second core material and a second wall material encapsulating said second core material, said second core material being a dye or a pigment, said first core materials being thermally responsive substances each undergoing change of state at a predetermined temperature different from the temperature of change of state of any other of said first core materials, said first wall and said second wall materials being frangible coatings rupturable by mild pressure, and indicator means associated with said first substances and said second substances, said indicator means being adapted to facilitate visual detection of the change of state of said first core materials.

21. Temperature indicator as in claim 20 wherein said indicator means comprises a compound which forms a eutectic mixture with said core material and which compound has a higher melting point than the highest melting core material in said regions.

22. Temperature indicator as in claim 20 wherein said first wall material and said second wall material are frangible coating of polymeric material.

23. Temperature indicator as in claim 20 wherein said first wall material and said second wall material are frangible coating of polymeric material.

* * * * *